Patented Aug. 27, 1935

2,012,684

UNITED STATES PATENT OFFICE 2,012,684

PROCESS OF REFINING GRAPHITE

Absalom M. Kennedy, University, Ala., assignor to W. H. Weller, Jr.

No Drawing. Application April 21, 1934, Serial No. 721,716

3 Claims. (Cl. 252—8)

This application is a substitute for my previously filed application, Serial No. 339,283, filed February 11, 1929.

This invention relates to the refining of graphite after it has been concentrated from natural graphite ores and has for its object the simple and economical production of graphite containing a very low percentage of metallic impurities, such as iron, aluminum, copper and so forth.

A further object is to provide a process for the production of refined graphite, utilizing therein an acid reagent to remove the metallic impurities and to regenerate this reagent in each cycle of operation of the process.

A still further object of this invention is to provide a process whereby a highly refined graphite suitable for use in the Leclanche type of dry batteries is produced from relatively low grade of graphite ores.

The use of graphite together with manganese dioxide as a material for the positive elements of dry batteries is rapidly increasing. For such use, silica, as an impurity in the graphite, is of less importance than iron, aluminum, copper, arsenic, nickel, cobalt, etc., since these metals tend to unite with the electrolyte and in this way to interfere with the electrochemical reaction within the cell; the effect of which is to reduce the capacity of the cell and to shorten its life.

I have found that the major part of the iron, aluminum, copper, nickel, and other metals which occur as impurities in the graphite, may be removed by treating the material with an ammonium sulphate, which reagent is regenerated in each cycle of operation of the process, as follows:

The concentrate, which is produced by mechanical treatment of graphite ores, is digested with a solution of ammonium bisulphate.

A reaction occurs in which the metallic impurities are removed from the graphite as soluble sulphates; which reaction, letting "$Al_2O_3$" represent these metallic impurities and "C", the graphite, which is precipitated, may be represented as follows:

$$C.Al_2O_3 + 6NH_4HSO_4 = Al_2(SO_4)_3 + 3(NH_4)_2SO_4 + 3H_2O + C.$$

The precipitate is separated from the solution and is washed and dried.

To the solution is added ammonia, as that produced in a subsequent reaction, when the metals present as sulphates in solution are precipitated as hydroxides.

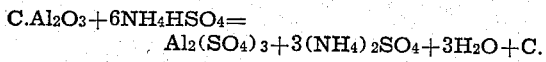
$$Al_2(SO_4)_3 + 3(NH_4)_2SO_4 + 6NH_3 + 6H_2O = 2Al(OH)_3 + 6(NH_4)_2SO_4.$$

The precipitate of metallic hydroxides is separated from the solution of ammonium sulphates which latter is evaporated and the resultant crystals are heated to about 300° C. when ammonia is driven off and ammonium bisulphate is formed.

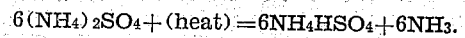
$$6(NH_4)_2SO_4 + (heat) = 6NH_4HSO_4 + 6NH_3.$$

This ammonium bisulphate may be used with a fresh batch of graphite concentrate, as in the first reaction, thus using and regenerating this reagent in each cycle of operation of the process. The ammonia may also be recovered and reemployed in the process as described above.

As an alternate procedure, I find that I may operate with the same materials as follows:

The graphite concentrate is heated to 300–400° C. with ammonium sulphate in a closed container.

On heating ammonium sulphate, $(NH_4)_2SO_4$, to this temperature, one half of its ammonia content is driven off and a mobile liquid, ammonium bisulphate, $(NH_4HSO_4)$, is formed which reacts with the metallic impurities, liberating the remainder of its ammonia content and forming sulphates of the metals.

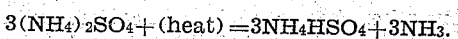
$$3(NH_4)_2SO_4 + (heat) = 3NH_4HSO_4 + 3NH_3.$$

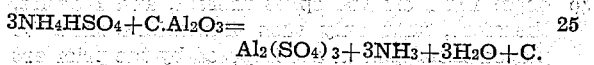
$$3NH_4HSO_4 + C.Al_2O_3 = Al_2(SO_4)_3 + 3NH_3 + 3H_2O + C.$$

Water is added to the product, preferably while still hot, to dissolve out the soluble sulphates. The precipitate is separated from the solution and is washed and dried.

To the filtrate, ammonia, as that driven off in the above reactions, is added. This may conveniently be done by sending it through the solution. The aluminum and other metallic constituents of the soluble sulphates are precipitated as hydroxides. This precipitate is separated from the solution.

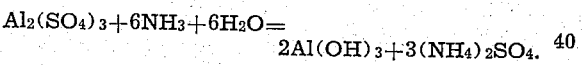
$$Al_2(SO_4)_3 + 6NH_3 + 6H_2O = 2Al(OH)_3 + 3(NH_4)_2SO_4.$$

The solution is evaporated and the resultant crystals of ammonium sulphate may be used with a fresh batch of graphite concentrate, as in the first step, thus using and regenerating this reagent in each cycle of operation of the process.

In practice, I prefer to operate as follows:

The graphite containing ore is crushed and is concentrated by the usual means, as by a log washer or a classifier, so as to remove as high a percentage of the impurities as possible and the concentrate is delivered to a vessel provided with an agitator and a means for heating.

Here it is mixed with a solution of ammonium bisulphate, as that produced in a later operation, containing at least twice as many $SO_4$ radicals as are indicated to form sulphates with the metallic impurities in the graphite concentrate.

The mixture is kept continuously agitated and is heated to boiling temperature ordinarily from 15 to 45 minutes according to the nature and amount of the impurities present in the graphite and the percentage of these impurities permitted in the finished product.

The filtrate and the precipitated graphite from the reaction described above are separated, as by a continuous suction filter, and the graphite is washed, preferably on the filter, until practically free from sulphates. It is then removed from the filter and is dried, pulverized, if desired, and is packed.

The filtrate, together with that portion of the wash water containing a sufficient amount of ammonium sulphate to make the recovery economical, is collected. Ammonia, as that driven off in the reaction in which ammonium sulphate is heated to convert it into ammonium bisulphate, is added in sufficient amount to precipitate, as hydroxides, the metals present as sulphates.

The precipitate is separated from the filtrate, as by a continuous suction filter, and the filtrate is sent to an evaporator, preferably of the multistage type, and is crystallized.

The crystals of ammonium sulphate are transferred to a closed container arranged for the collection of the gases given off and the mass is heated to about 300° C.

The ammonia evolved is collected for utilization in the precipitation of the metallic hydroxides, as shown above. The ammonium bisulphate produced is preferably run by gravity while in a fluid state, that is above 150° C., into the water for the treatment of a fresh batch of graphite concentrate.

While I have described my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A cyclic process of obtaining purified graphite from concentrated graphite ore containing metallic impurities, which consists in digesting the concentrated ore with a solution of ammonium bisulphate to precipitate the purified graphite and to form sulphated impurities in solution, separating and drying the purified graphite, separating the impurities from the solution as hydroxides by adding ammonia to the solution, and heating the ammonium sulphate formed to a temperature of about 300° C. to separate ammonia and ammonium bisulphate for reuse in the process.

2. A cyclic process of refining concentrated graphite ores containing iron, aluminum, and other metallic impurities which comprises digesting the graphite concentrate with a solution of ammonium bisulphate, separating the graphite from the solution of sulphates, adding ammonia to precipitate the impurities as hydroxides and separating this precipitate from the solution, evaporating the solution to form ammonium sulphate crystals, and heating these crystals to produce ammonium bisulphate and ammonia for reuse with fresh concentrate.

3. A process of purifying graphite ore concentrates containing metallic impurities comprising heating a mixture of the concentrates with ammonium sulphate to form a reactive mixture of concentrates and ammonium bisulphate and thus forming soluble metallic sulphates, adding water to dissolve the sulphates and to separate purified graphite, recovering the ammonia driven off by the heat, and bringing about a reaction between the ammonia and the solution of metallic sulphates to precipitate metallic hydroxides and form ammonium sulphate for reuse with a subsequent batch.

ABSALOM M. KENNEDY.